J. E. BJORLIE.
CAMERA ATTACHMENT.
APPLICATION FILED JUNE 30, 1913.

1,093,821.

Patented Apr. 21, 1914.

WITNESSES:
D. E. Carlsen
A. E. Carlsen

INVENTOR.
John E. Bjorlie.
BY his ATTORNEY:
A. M. Carlsen.

UNITED STATES PATENT OFFICE.

JOHN E. BJORLIE, OF PEKIN, NORTH DAKOTA.

CAMERA ATTACHMENT.

1,093,821. Specification of Letters Patent. Patented Apr. 21, 1914.

Application filed June 30, 1913. Serial No. 776,565.

*To all whom it may concern:*

Be it known that I, JOHN E. BJORLIE, a citizen of the United States, residing at Pekin, in the county of Nelson and State of North Dakota, have invented a new and useful Camera Attachment, of which the following is a specification.

My invention relates to attachments for photographic cameras; and the object of the invention is to provide a camera with automatic means which will operate the shutter of the camera at any predetermined time for which it is regulated, thus enabling the photographer to leave the camera and join the person or group of persons to be photographed, or to photograph his own person alone whenever so desired.

Another object is to make such attachment suitable for both fast and slow snap shots, and also for time exposures.

Figure 1:
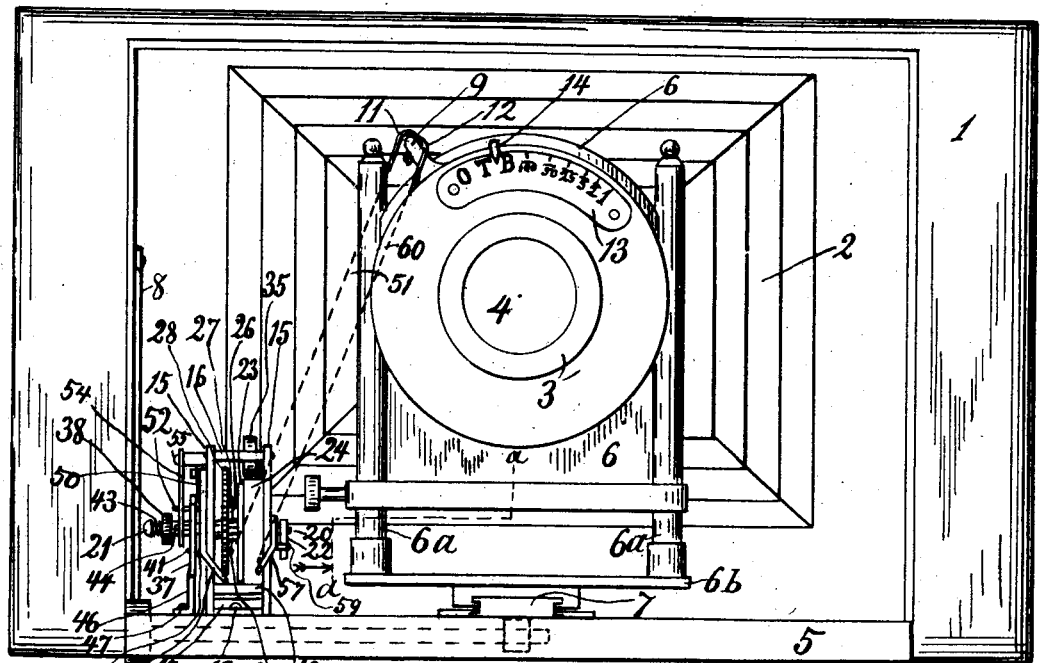
Figure 2:
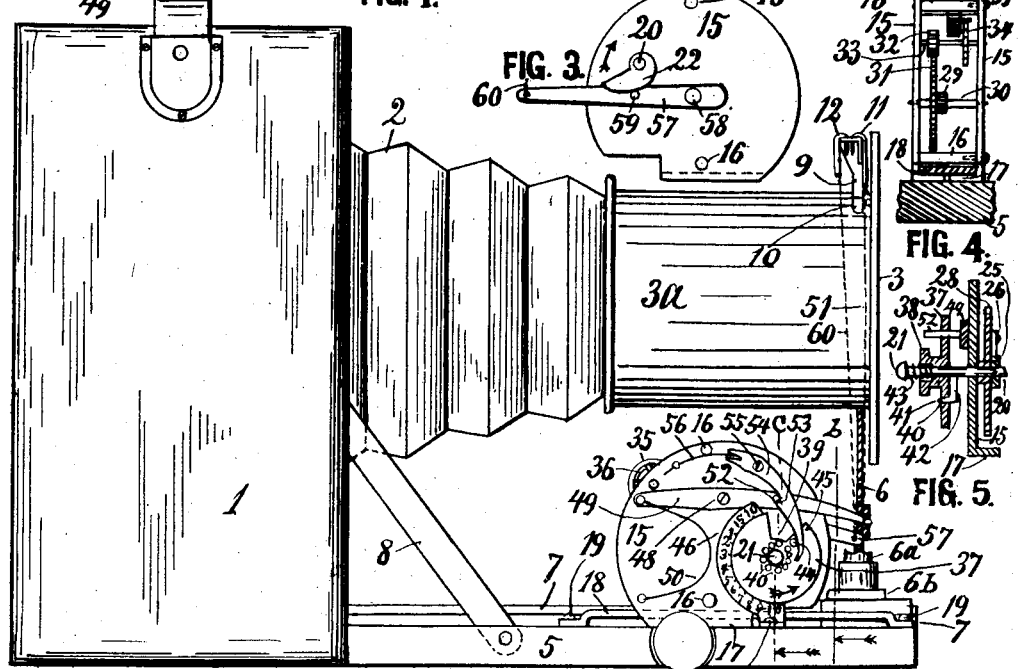

In the accompanying drawing,—Figure 1 is a front elevation of a camera provided with my attachment and open ready for use. Fig. 2 is a side elevation of the camera and attachment shown in Fig. 1 with one of the posts 6 and a portion of the plate or web 6 between said posts intersected on the line a—a Fig. 1, and the winding stem of the attachment reduced to avoid obstruction. Fig. 3 is a right hand side elevation of the frame, showing the time exposure lever and cam of the attachment. Fig. 4 is a section on the line b—b Fig. 2 with many parts omitted. Fig. 5 is a section on the line c—c Fig. 2 through the left side portion of the attachment, with some parts omitted.

Referring to the drawing by reference numerals, 1 designates the casing, 2 the bellows, 3 the lens frame and 4 the lens of any camera adapted to have my attachment mounted upon it, 5 is the projecting base upon which the lens tube 3ª is supported by a web or plate 6, held in posts 6ª fixed in a cross bar 6ᵇ, which is slidable upon a rail 7, on which it is moved and secured by different means on the different cameras.

In the present illustration the camera being of the small type often carried in a pocket, the support 5 is formed of the front side or door of the casing 1, to which it is hinged at its lower edge and when open is supported in horizontal position by a brace 8.

9 is the trigger or lever operating the shutter, it projects out of a slot 10 in the lens tube 3ª and is provided with a hole into which two hooks 11 and 12 of my attachment are placed, as will presently be fully described.

The scale 13 found above the lens is well understood by photographers to indicate various lengths of exposure and is utilized to regulate the period of exposure by simply setting the pointer 14 to the desired place on the scale before operating the trigger 9; and for time exposure the pointer is placed at the letter T of the scale and the trigger 9 operated twice with the desired period of exposure between each operation, one operation opening the shutter and the second closing it.

The attachment comprises a suitable frame and a simple clock work mechanism mounted therein. In the present illustration said frame is composed of two side plates 15 secured together by bars 16 and having angular bottom portions 17 which are clamped between the base 5 and a metal strip 18 secured thereon by screws 19, so so that the frame is friction-held in any forward position by the more or less forward position of the lens holder.

The clock mechanism in the frame may be much varied, in the present instance it consists of a main shaft 20 journaled in the frame and having at one end a head 21 and at the other end a fixed cam 22. Within the frame is fixed to the shaft a spring 23 which is of the usual clock spring type and has its outer end attached to a cylinder 24, that is fixed on the frame. On the shaft is also fixed a ratchet wheel 25 engaged by a pawl 26, which is pressed by a spring 27. Said pawl and spring are mounted on a cog wheel 28, which is loose on the shaft and meshes with a pinion 29 fixed on a second shaft 30 (see Fig. 4). To said pinion 29 is fixed a cogwheel 31, which drives a pinion 32, fixed on a shaft 33, on which an escapement wheel 34 is also fixed and engages the balance wheel 35 of the escapement.

In Fig. 2 36 indicates the hairspring of the escapement.

Rotatably mounted on the shaft 20 outside the frame is a disk 37, whose hub 38 forms a winding stem to the spring 23. Said disk is provided with a radial notch 39 (see Fig. 2) and a concentric circle of ten holes, 40, each of which may receive a finger 41 of an arm 42, that is fixed in the shaft (see Fig. 5).

43 is a coil spring partly compressed between the head 21 and the bottom of a central cavity in the winding stem; said spring serves to hold the disk normally against the finger 41. Said disk is also provided with a stud 44 and a radial mark 45, which by turning of the disk will point to any of the marks and numerals of a curved scale 46, whose lower end forms a bracket secured upon the base by a screw 47.

Upon the side of the frame just described there is fulcrumed at 48 a lever 49, whose rear end is normally held upward by a spring 50. The front arm of said lever is connected by a cord or other flexible element 51 with the hook 11 and is provided with a lateral pin 52, which when the lever is raised engages upon a tooth 53 of a trip lever 54, which is pivoted at 55 and engaged by a spring 56, which at all times tends to hold the trip lever in engaging relation to the pin 52, and will only yield while the pin 44 disengages the trip lever from the pin 52. At the other side of the attachment (best shown in Fig. 3) a lever 57 is fulcrumed at 58 and provided with a pin 59 for the cam 22 to act on in depressing the lever. To the front end of this lever the hook 12 is attached by a flexible element 60.

The operation of the camera and the attachment is as follows: When the operator is ready to operate the shutter but he desires to join the group that is to be taken on the picture, he decides his position on the group and walks over and occupies that position, but not until he has wound up the spring by turning the stem 38 and thereby the disk 37 in the direction of the arrows in Figs. 2 and 3, until the mark 45 gets to the number "15" on the scale 46, (said "15" indicating the number of seconds that will lapse before the clock work moves the shutter lever to active position). He also places the hook 11 in the shutter arm, bringing thereby the pin 52 upon the catching tooth 53, and places the pointer 14 at the desired mark to the right of the letter B on the scale 13, and he leaves the hook 12 disengaged from the shutter arm for snap shots of any duration indicated upon said part of the scale 13. He now touches the balance wheel 36 lightly to start the clock work and then walks over and takes his place in the group, and 15 seconds after he started the device the pin 44 will act on the trip lever 54 and release the lever 49, which lever by the spring 50 is at once thrown downward with the front end, which acts on the shutter arm or trigger 9, and a moment later the clock work is stopped by the engagement of the pin 52 with the rear edge of the notch 39. If the operator thinks 15 seconds too long a time for taking his position he may leave the mark 45 nearer up to the number "10" at the top of the scale.

For time exposure the pointer 14 on the camera is moved to the letter T, so that the shutter mechanism (not shown) requires one downward stroke of the arm 9 to open the shutter and another such stroke to close it. The two hooks 11 and 12 are placed in the trigger 9, the disk 37 is turned by the winding stem until the cam 22 stands in the position shown in Fig. 3, the disk is then pulled outward beyond the finger 41, and turned with the mark 45 to one of the numbers "1" to "10" on the lower part of the scale 46, to indicate the number of seconds the exposure is to last, the time mechanism is then started, and as the cam 22 passes the pin 59 the shutter lever has thereby been pressed downward the first stroke and is then raised by its own spring (not shown), and as the main spring 23 keeps on rotating the disk 37, the latter will act on the trip lever 54 and drop the lever 49 and thereby impart a second downward stroke of the shutter lever, and the disk will stop against the pin 52 exactly the same as in the snap-shot action above first described.

Where so desired the lower part of the scale 46 may be made longer than to indicate only ten seconds. Such and similar alterations I consider as falling within the scope and spirit of the invention.

What I claim is:—

1. The combination with a camera and its shutter, of a device adapted to be mounted on the camera and connected with the shutter; said device comprising a frame, a clock work in the frame, a winding shaft, a disk mounted on the winding shaft and having a wide radial notch, a main lever fulcrumed on the frame and having a lateral pin adapted to engage in said notch when the lever is swung downward, a spring acting on the lever to swing it downward, a spring-pressed trip-lever mounted on the frame and having a catch adapted to engage the lateral pin and hold the main lever in its upper position, a cord or other flexible member attached to the front end of said main lever and operatively and detachably attached to the shutter lever, said disk having a lateral pin arranged to disengage the trip lever when the main lever is to drop, and means indicating different lengths of time at which the disk may be set with its pin away from the trip lever.

2. In a device of the class described and mounted on a camera having a shutter and a lever operating the shutter, a frame, a clock work in the frame, a winding shaft, a disk mounted on the winding shaft and having a wide radial notch, a main lever fulcrumed on the frame and having a lateral pin adapted to engage in said notch when the lever is swung downward, a spring acting on the lever to swing it downward, a spring-pressed trip-lever mounted on the frame and having a catch adapted to engage the lateral pin and hold the main lever in its upper position, a cord or other flexible member attached to the front end of said main lever and operatively and detachably attached to the shutter lever, said disk having a lateral pin arranged to disengage the trip lever when the main lever is to drop, and means indicating different lengths of time at which the disk may be set with its pin away from the trip lever, said disk being slidable on the winding shaft and having a circular concentric row of apertures, an arm fixed on the shaft and having a finger arranged to engage in either one of said apertures, a spring acting on the disk to hold it toward said arm; a cam fixed on the shaft, a second lever pivoted on the frame and having a flexible member detachably attached to the shutter lever, said second lever having a lateral pin arranged to be engaged by the cam so as to open the shutter some time before the pin in the disk operates to close it.

In testimony whereof I affix my signature in presence of two witnesses.

JOHN E. BJORLIE.

Witnesses:
E. C. BREKKEN,
H. G. SCAUSEN.